United States Patent [19]
Griffin et al.

[11] Patent Number: 5,446,768
[45] Date of Patent: Aug. 29, 1995

[54] CONFIGURATION DETECTION APPARATUS FOR DATA LINK

[75] Inventors: Michael E. Griffin; Christopher R. Yungers, both of St. Paul, Minn.

[73] Assignee: Minnesota Mining and Manufacturing Company, Saint Paul, Minn.

[21] Appl. No.: 159,036

[22] Filed: Nov. 29, 1993

Related U.S. Application Data

[60] Division of Ser. No. 946,007, Sep. 15, 1992, Pat. No. 5,267,069, which is a continuation of Ser. No. 326,284, Mar. 21, 1989, abandoned.

[51] Int. Cl.$^6$ ............................................. H04L 23/00
[52] U.S. Cl. .................................................... 375/377
[58] Field of Search .................. 375/121, 36, 10; 455/67.1, 115, 226.1; 370/79, 17

[56] References Cited

U.S. PATENT DOCUMENTS

4,833,696  5/1989  Ichiyoshi ............................. 375/121
4,884,287  11/1989  Jones et al. ........................ 375/121

Primary Examiner—Stephen Chin
Assistant Examiner—Hai H. Phan
Attorney, Agent, or Firm—Gary L. Griswold; Walter N. Kirn; Stephen W. Buckingham

[57] ABSTRACT

Apparatus for use with a fiber optic data channel includes a configuration block that determines the configuration of a communication port associated with the apparatus. The apparatus further includes multiplexer/transmitter for transmitting data and configuration information to a distant apparatus and a receiver/demultiplexer for receiving data and configuration information from the distant apparatus.

7 Claims, 4 Drawing Sheets

CONFIGURATION DETECTION APPARATUS FOR DATA LINK

This is a continuation of application Ser. No. 07/946,007 filed Sep. 15, 1992, which is a continuation of application Ser. No. 07/326,284 filed Mar. 21, 1989, now abandoned.

Many standards exist in the field of data communications. There are, for example, many software standards, or protocols, for encoding and transmitting the data. Some of these standards provide the ability of discovering or even correcting transmission errors.

Before the question of such software standards can even be reached, however, choices must be made among a myriad of hardware standards. Such hardware standards may provide for "parallel" data transmission in which a plurality of data bits are transmitted simultaneously. Usually a parallel data communications channel will provide for the transmission of eight data bits at a time, corresponding to an eight-bit byte. There is nothing that inherently restricts such parallel communications to eight-bit data channels, however, and any convenient number of bits may be transmitted simultaneously.

Alternatively a data channel may be a serial data channel in which a single data bit is transmitted at a time. The data bits are then accumulated by the receiver and assembled into the desired groupings, again typically, although not necessarily, eight-bit bytes.

In addition to the data being transmitted most data communication channels, both parallel and serial, will include a number of control signals. These control signals will allow the ports communicating with one another to properly utilize the communications channel to insure that information is correctly transmitted and received.

Perhaps the best known standard for a serial communication channel is the RS232C. The RS232C standard specifies specific uses for each of 25 signal lines connecting two electronic systems that are to communicate with one another. Of these 25 lines, two are for data transmission, one in each direction, and the others are used either to match electrical ground potentials between the two systems or to provide control signals.

The RS232C standard is defined for communications between two different types of devices. These are referred to as data terminal equipment-type devices (DTE) and data communication equipment-type devices (DCE). At times, however, it is desirable to use an RS232C channel to cause two devices, each of which is configured as a DTE, to communicate with one another. Additionally, although it makes little sense in terms of the definitions in the standard, in the real world it is sometimes desirable to connect two DCE devices for communication with one another. Furthermore, even within the definitions of DTE and DCE, there is some room for variation from one system to another. As a result, the exact configuration of the devices to be connected must be known in advance and special cables and/or jumpers provided in order to permit communication between the devices.

At times it is desirable to substitute optical fiber for electrical wires in data communication cable. That is because capacitance of the wires limits transmission distance, a problem that does not exist with optical fiber. Furthermore, in an electrically noisy environment electrical signals on wires are subject to degradation while optical signals are not. In such a system the digital state of several lines of a communication channel, as received from a communication port, are multiplexed into a single data packet and transmitted on a single fiber. This does not relieve the operator of the requirement of advance knowledge of the nature of the communication ports, however, because the receiver must demultiplex the signals and send them to the proper line of the receiving communication port.

SUMMARY OF THE INVENTION

According to the present invention apparatus is provided for use with a fiber optic data channel. The apparatus includes a multiplexer/transmitter for multiplexing data into data packets and transmitting the data packets over an optical fiber, the transmitted data packets including configuration data packets and message data packets. The apparatus further includes configuration block for detecting the configuration of an associated communication port and providing information about that configuration to the multiplexer/transmitter for construction of transmitted configuration data packets. The configuration block also configures the apparatus for proper operation with the local communication port and with a distant communication port. The apparatus also includes a receiver/demultiplexer for receiving data packets on an optical fiber and demultiplexing said data packets. The received data packets include configuration data packets and message data packets. The receiver demultiplexer sends data from configuration data packets to the configuration block and data from the message data packets to the local communication port.

DETAILED DESCRIPTION OF THE DRAWING

DETAILED DESCRIPTION OF A PREFERRED EMBODIMENT

The present invention will be described in terms of a data communication system comprising a local communication port and a distant communication port. Each of the ports is capable of transmitting and receiving information on a plurality of parallel information channels. It will be understood, however, that the communication ports need not be parallel ports in the traditional sense of that term. For the purposes hereof, communication ports capable of transmitting and receiving parallel information will also include traditional serial communication ports where two parallel channels are used to transmit data, one for each direction of transmission or where data is transmitted on one or more channels parallel to control signals on other channels.

In the present invention the requirement of having advance knowledge of the configuration of a communication port is eliminated by providing a circuit that senses that configuration. After the configuration has been determined, information concerning it is stored in a register and is transmitted to a similar circuit connected to a distant communication port. A similar circuit at the distant communication port senses the configuration of its associated port and stores information concerning that configuration and transmits it back to the original circuit. Both of the circuits then determine whether a valid connection is possible between the two ports and automatically configure themselves for communication.

Figure 1:
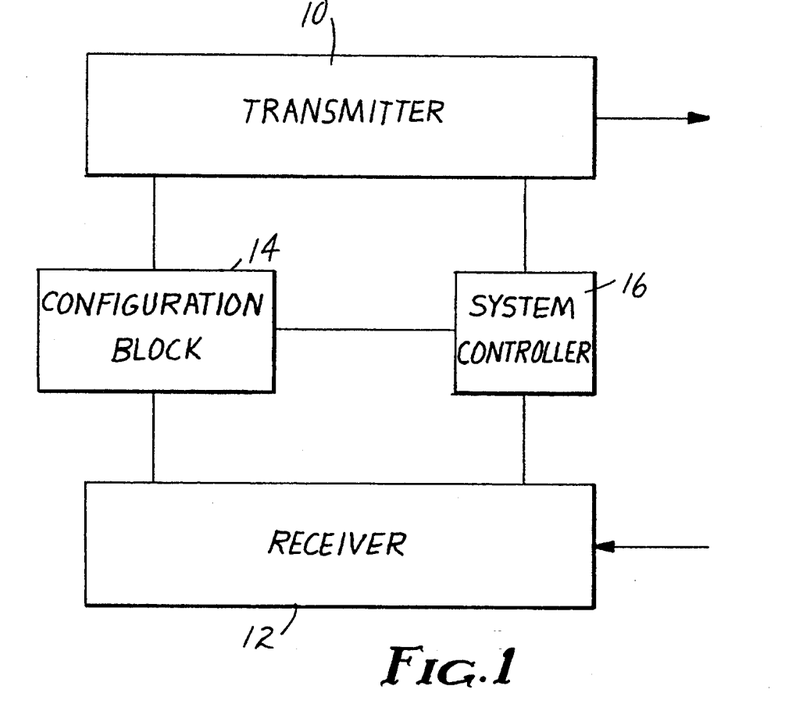
FIG. 1 is a block diagram of the present invention.

FIG. 1 is a block diagram of a data link according to the present invention. The data link of FIG. 1 includes a transmitter 10, a receiver 12, a configuration block 14 and a system controller 16. System controller 16 provides control signals such as clock signals and enable and disable signals to the other portions of the circuit.

Figure 2:
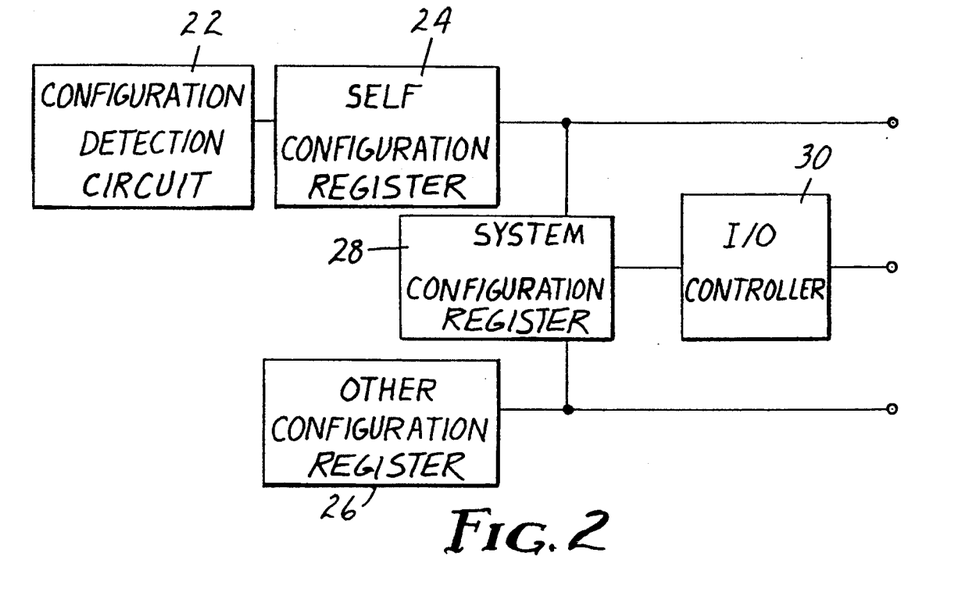
FIG. 2 is a block diagram of the configuration block of the present invention.

Configuration block 14 is shown in more detail in FIG. 2. Configuration block 14 includes configuration detection circuitry 22, self-configuration register 24, other configuration register 26, system configuration register 28, and input/output controller 30.

Configuration detection circuitry 22 provides circuitry for determining if information channels or lines in a communication port to which it is connected are intended to be inputs or outputs. Two strategies for making such a determination are employed. The first is to monitor an information channel in the communication port to determine whether the electrical potential is changing between digital states. If it is, the port is driving the channel and it is an output for that port.

Figure 3:
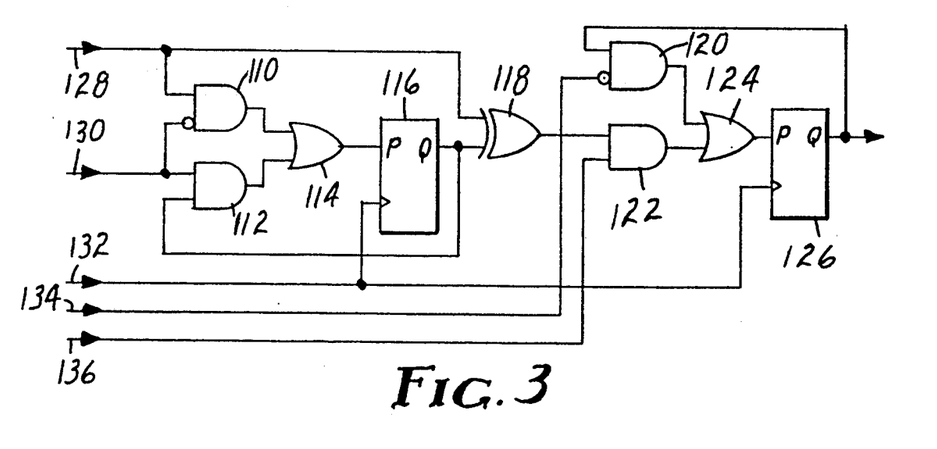
FIG. 3 is an electrical schematic diagram of a first circuit for detecting the configuration of a communication port.

FIG. 3 illustrates a circuit for so monitoring an information channel. The circuit of FIG. 3 includes an input register comprising AND gates 110 and 112, OR gate 114 and D-Type flip-flop 116 and a difference generator and register comprising EXCLUSIVE-OR gate 118, AND gates 120 and 122, OR gate 124 and D-Type flip-flop 126.

There are five input signals to the circuit of FIG. 3. These signals are the data signal received from the communication port and applied to line 128, a Hold-Not Hold signal applied to line 130, a system clock signal applied to line 32, a reset signal applied to line 134 and a test signal applied to line 136.

Initially during the test sequence the Hold-Not Hold signal on line 130 and the test signal on line 136 are held low while the reset signal on line 134 is held high.

Since line 130 is in a low state the output AND gate 112 will be low while the output of AND gate 110, and thus OR gate 114 will follow the data input signal on line 128. Thus at the first clock pulse on line 132 the value of the current data signal on line 128 will be stored in flip-flop 116.

At the same time, since the reset signal on line 134 is held high and the test signal on line 136 is held low, both AND gate 120 and AND gate 122, and as a consequence OR gate 124, will have low output signals. Thus on the same first clock cycle a low value will be stored in flip-flop 126.

After the system clock signal on line 132 has been cycled causing the initial values to be stored in flip-flop 116 and 126 as described above, the Hold-Not Hold, reset and test signals are all inverted. Because the Hold-Not Hold signal on line 130 will then be at a high value, AND gate 110 will have a low input and thus will have a low output regardless of the value of the data signal on line 128. Conversely AND gate 112 will receive a high input signal from line 130. Thus the output of AND gate 112 will be high if the output of flip-flop 116 is high or low if the output of flip-flop 116 is low. OR gate 114 will thus receive a low signal from AND gate 110 and either a high or low signal from AND gate 112, the value of the signal from AND gate 112 being the same as the output of flip-flop 116. Thus the output of OR gate 114 will be the same as the output of flip-flop 116. This results in the value in flip-flop 116 remaining unchanged when Hold-Not Hold signal on line 130 is high.

Since the output of flip-flop 116 is latched at the value of the data signal during the first time period, EXCLUSIVE-OR gate 118 will always receive one input signal equal to that initial data value during the test. The other input to EXCLUSIVE-OR gate 118 will be equal to the subsequent data signals during the test. As a result, the output of EXCLUSIVE-OR gate 118 will be equal to zero at any time that the data signal is the same as the initial data signal latched in flip-flop 116 and will be high if the data signal differs from the initial value.

Because the reset signal on line 134 is low, AND gate 120 will receive one high input. The other input to AND gate 120 is the output signal from flip-flop 126. Since flip-flop 126 was reset to a low output value, this signal will initially be low. Therefore, the output of AND gate 120 will initially be low. The test signal on line 136 is high, giving AND gate 122 a high input. Therefore, the output signal from AND gate 122 will equal the output signal from EXCLUSIVE-OR gate 118. Thus, AND gate 122 will have a high output if a difference between the initial data signal latched in flip-flop 116 and a subsequent data signal on line 128 is detected and low otherwise. If such a difference is detected, OR gate 124 will receive a high input signal and will be then provide a high output signal. On the next cycle of the clock signal on line 132 that high signal will be latched into flip-flop 126. Thereafter, the output of flip-flop 126 will be high. That high signal will be fed back to AND gate 120, which thereafter will have two high signals, insuring that OR gate 124 will always receive at least one high input signal. Thus, the output of flip-flop 126 will be guaranteed to remain high until the system is reset to begin the detection process again.

If the output signal from flip-flop 126 is high, the signal on data input line 128 has changed digital states. For this to be true, data input line 128 must be connected to an output line on the communication port to which the circuit is attached. Since the line is known to be an output, the self-configuration circuitry may proceed with the configuration process. If the output signal from flip-flop 126 is low, however, there is no assurance that the line of the port to which data in line 128 of the present circuit is connected is an input line. The possibility remains that it could be an output line that has not changed digital states during the time of the test.

If the test of the circuit of FIG. 3 is unable to conclusively determine that line 128 is connected to an output of the communication port to which the circuit is connected, a different test strategy may be employed. A circuit for the alternative test strategy is provided in FIG. 4. The strategy of the circuit of FIG. 4 is based on a difference between an output line and an input line in a communications port.

If a particular line is an output line, it will have connected to it a driver intended to hold the line at a particular voltage indicative of the current logic state. If, however, the line of the port to which line 128 is connected is an input, the circuitry in the port will be intended to since the voltage imposed by an outside source. The strategy of the circuit of FIG. 4, thus, is to attempt to drive line 128 alternately to the high and low voltage states and monitor what its voltage is. Driver 144 and resistor 146 are chosen such that they will easily drive line 128 to the desired voltage if line 128 is connected to an input of the port, but will be overcome by the effect of a typical driver in an output line of a communications port. Thus if line 128 is at a high voltage level while driver 144 is attempting to drive it to the low voltage level or if line 128 is at the low voltage level while driver 144 is attempting to drive it to the high voltage level, then line 128 is connected to an output of the communications port. If, alternatively, line 128 consistently follows the output level of driver 144, line 128 is connected to an input line of the communications port.

Figure 4:
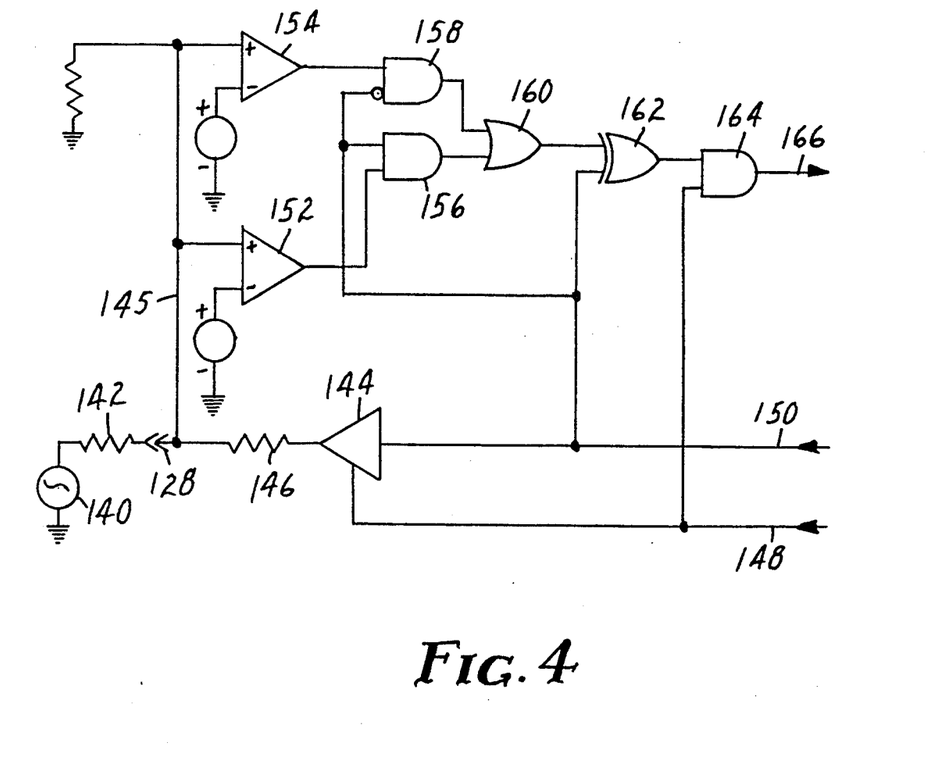
FIG. 4 is an electrical schematic diagram of a second circuit for detecting the configuration of a communication port.

When the circuit of FIG. 4 is not to be used, the test signal on line 148 is put into the low logic state. That causes driver 144 to go into high impedance mode, effectively causing the signal on line 150 to have no effect on the circuit. Since the test signal on line 148 is also coupled to one input of AND gate 164 causing the signal on line 148 to be low will insure that the output of the circuit of FIG. 4 on line 166 will be low.

When the circuit of FIG. 4 is to be used to test a signal line, the test signal on line 148 is set high and the signal on line 150 is alternately cycled between the low and high levels. The output of driver 144 will follow the signal on line 150. Thus when the signal on line 150 is low, the output of driver 144 will be low. As explained previously the circuit is intended then to determine whether driver 140 is driving line 145 to a high voltage level when driver 144 is attempting to drive it to a low voltage level.

This discussion will assume that line 150 is initially set to the system low voltage level and subsequently cycled to the system high voltage level, although there is no particular preference for this sequence over its reverse. Since line 150 is at a low voltage level and is connected to one input of AND gate 156 the output of AND gate 156 is guaranteed to be low. Since the signal on line 150 is connected through an inverter to one input of AND gate 158 the output of AND gate 158 will follow the output of voltage comparator 154.

Voltage comparator 154 has its minus input connected to a voltage source providing the high signal threshold voltage, i.e., the voltage level above which a signal will be interpreted as being at the system high voltage level. If the signal on line 145 is above the high level threshold voltage, the output of AND gate 154 will be high. If that is the case the output of AND gate 158 will be high as will be the output of OR gate 160. EXCLUSIVE-OR gate 162 has one input connected to line 150 and one input connected to the output of line 160. If line 145 is driven to a high state while a low logic signal is on line 150, EXCLUSIVE-OR gate 162 will have one high and one low signal and will have a high level output. Therefore the output of AND gate 164 on line 166 will be high. This high value may then be stored in flip-flop 126 in FIG. 3, or in another register, to indicate that the signal line to which the circuit is connected is an output line of the associated communication port.

If the signal on line 145 is low when the signal on line 150 is low, the voltage provided to the plus input of voltage comparator 154 will be below the threshold voltage applied to the minus input and the output of voltage comparator 154 will be low. This will cause the outputs of AND gate 158 and OR gate 160 to be low causing EXCLUSIVE-OR gate 162 to receive two low signals. Thus the output of OR gate 162 will be low as will the output of AND gate 164 causing the circuit of FIG. 4 to have a low output on line 166. In this situation, the line of the communication port associated with the circuit has not been shown to be an output line, but cannot be assumed to be an input line either.

If the line of the communications port to which the circuit is connected has not been determined to be an output line when the signal on line 150 is low, line 145 is again monitored when the signal on line 150 goes to the high logic state. When the signal on line 150 goes to the high logic state AND gate 158 will receive at least one low input signal and so will have an output in the low logic state. AND gate 156, however, will receive at least one high level input signal, so its output will follow the signal that it receives from voltage comparator 152.

Voltage comparator 152 has applied to its minus input a signal at the low level voltage threshold. If the signal on line 145 has followed the signal on line 150 and thus is at the system high voltage level, the voltage applied to the plus input of voltage comparator 152 will be above the low level voltage threshold and the output of voltage comparator 152 will be at the high voltage level. As a result the output signal from AND gate 156, and as a result the output signal from OR gate 160, will be at the high voltage level. Thus EXCLUSIVE-OR gate 162 receives two high level input signals, one from line 150 and one from OR gate 160. This causes the output signal from EXCLUSIVE-OR gate 162 to be at the low voltage level. Thus AND gate 164 receives one low level input signal and one high level input signal and provides a high level output signal on line 166. This is what is to be expected because line 145 has followed the input signal on line 150. If, however, line 145 stays at the system low voltage level when line 150 goes to to the high voltage level, voltage comparator 152, AND gate 156 and OR gate 160 will each provide a low voltage output signal. Thus EXCLUSIVE-OR gate 162 will receive one low level input signal and one high level input signal and will provide a high level output signal to AND gate 164. AND gate 164, therefor, receives two high level output signals and provides a high level output signal on line 166 indicating that the line to which the circuit is connected is an output line of the associated communication port.

This test is continued while the signal on line 150 is cycled a number of times. If the line of the associated communication port is ever determined to be an output, the test may be deemed completed. If after a predetermined number of cycles it has not been found to be an output, the fact that the voltages on line 145 have consistently followed the voltages applied to line 150, indicates that the line of the associated communication port is an input.

Figure 5:
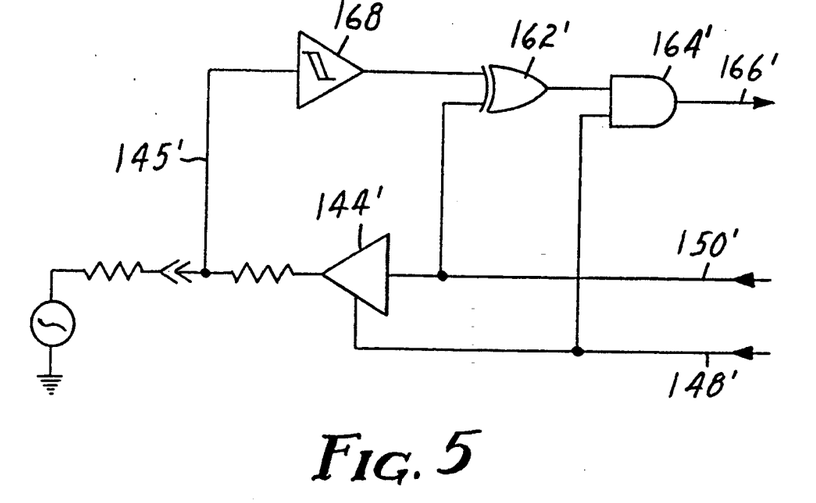
FIG. 5 is an electrical schematic diagram of an alternative embodiment of the second circuit for determining the configuration of a communication port.

FIG. 5 shows an alternative circuit that may be used in place of the circuit of FIG. 4. In the circuit of FIG. 5 tri-state driver 144' acts in a manner comparable to tri-state driver 144 of FIG. 4. When the test is enable by applying a high voltage level to line 148', tri-state driver 144' will attempt to drive line 145' to alternately high and low voltage levels following the signal applied to line 150'. Schmitt trigger 168 is chosen such that a system high voltage level applied to its input will drive it to its high output state while a system low voltage level applied to its input will drive it to its low voltage output state. EXCLUSIVE-OR gate 162' then simply compares the output of Schmitt trigger 168 with the signal applied to line 150'. If they are the same, EXCLUSIVE-OR gate 162' will provide a low output signal. If they are different, however, EXCLUSIVE-OR gate 162' will provide a high level output. As long as the test is enabled AND gate 164' will provide an output equal to the output signal from EXCLUSIVE-OR gate 162'. Thus at any time that the signal on line 145' and that on 150' are different, a high level output signal will be provided on line 166'.

Figure 6:
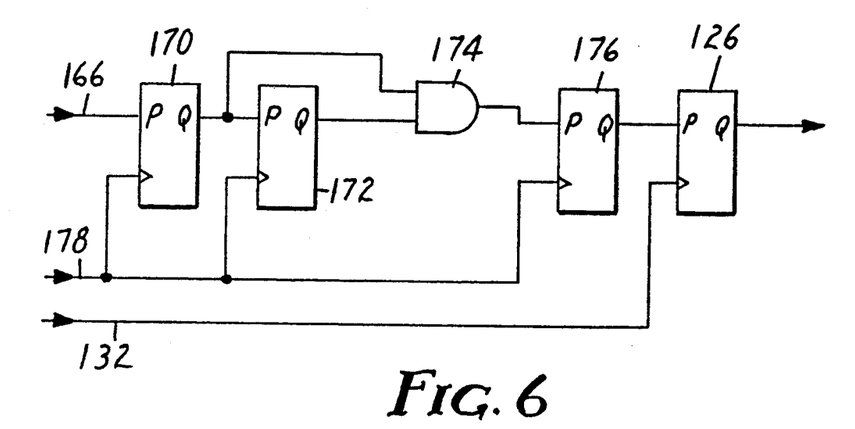
FIG. 6 is an electrical schematic diagram of a digital filter for use with the present invention.

Both of the circuits shown in FIGS. 4 and 5 will provide transients when the signal on line 150 or 150' change. FIG. 6 shows an additional circuit that will overcome errors that may result from the transients. In the circuit of FIG. 6 flip-flop 170, 172, and 176, and AND gate 174 provide a digital filter to ensure that the high output on line 166 or 166' of FIGS. 4 and 5, respectively, is maintained for a sufficient length of time to ensure that the high output is actually indicative of a determination that the line of the associated communication port is in fact an output line. A filter clock signal is provided on line 178. The filter clock signal on line 178 is preferably at a lower frequency than the system clock signal on line 132. The input of flip-flop 170 receives the signal from line 166 or 166'. The value of that signal is latched in flip-flop 170 when the filter clock is cycled. That value is then provided to the input of flip-flop 172 and latched there on the next cycle of the filter clock. The output of both flip-flop 170 and 172 are then combined by AND gate 174. Therefore AND gate 174 will only provide a high level output if line 166 or 166' provide a high level output for at least two periods of the filter clock on line 178. If this occurs the high level signal on line 166 is not likely to have been caused by a transient and the value is stored in flip-flop 176. Flip-flop 176 in turn provides it to flip-flop 126, from which the remaining circuitry can determine that the circuit is connected to an output line of the associated communication port.

The information derived from the analysis above is then stored in self-configuration register 24. The configuration information may be directly descriptive of the configuration, such as by providing one bit for each line in the communication port. In that situation, each bit would have a value indicative of whether the particular line with which it is associated is an input or an output.

Alternatively, a system of codes could be used. This is useful when not all possible configurations of a port are valid according to the standards for the type of port. This reduces the number of bits that must be stored and must be transmitted to the receiver. For example, in a preferred embodiment for use with RS232 communication ports the signals on 9 of the 25 lines are transmitted over the data channel. While the 9 lines could be configured as inputs or outputs in 512 ways, only 22 of those are possible if the RS232 standard is followed. Therefore, only 5 bits need be stored and transmitted to indicate the configuration rather than 9.

This configuration information must next be transmitted to a similar circuit associated with the distant communication port and the configuration information for the distant communication port must be obtained from the similar circuit associated with the distant port. In this way the transmitters and receivers can ensure that they are properly configured to work together. Since the transmitter will be sending data packets containing configuration information as well as data that is to be transmitted to the communication port, the receiver must, therefore, be able to differentiate between the signals sent for configuration purposes and the signals that are to be transmitted onto the communication port.

The present invention includes in each data packet a data identification bit that indicates to the receiver whether the data packet is indicative of configuration information or contains transmitted data to be relayed onto the communication port associated with the receiver. If the information is configuration information the receiver stores the information in other configuration register 26 and then compares the information in that configuration register with its own configuration information stored in self-configuration register 24, to determine whether a valid connection can be obtained.

Figure 7:
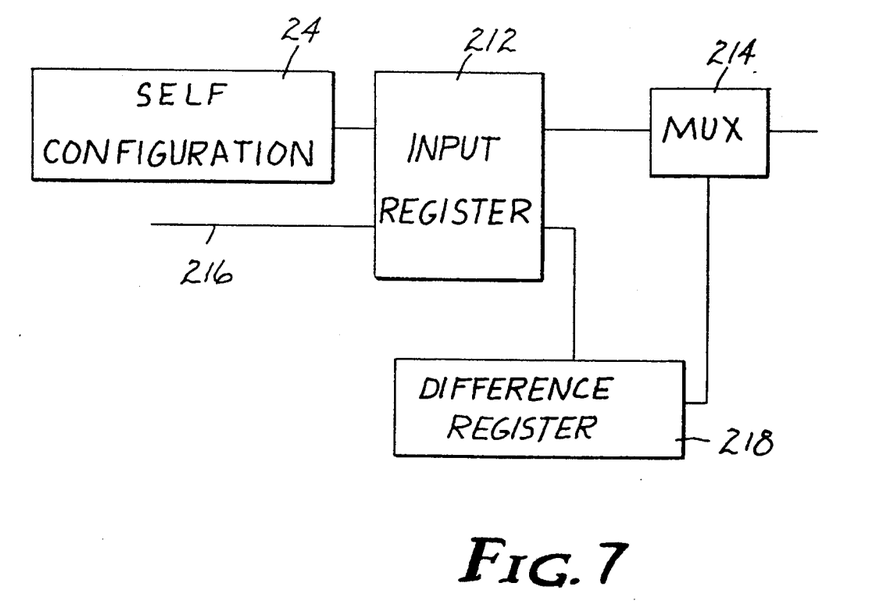
FIG. 7 is a block diagram of a transmitter for use with the present invention.

FIG. 7 is a block diagram of transmitter 10 of FIG. 1. Also shown is self-configuration register 24. Before any data is transmitted, self-configuration register 24 will have stored therein information describing the configuration of the communication port. This information may have been determined by the automatic configuration circuitry described above or may have been programmed by a user.

It should be noted that, if automatic configuration is used, it is not necessary to sense the status of all lines in the communication port. For example, it is possible to sense only lines 2 and 3 of an RS232 port and use the information obtained thereby to determine if the port is configured as a DTE or DCE.

In order to insure that the transmitter and receiver are properly configured for communication with one another, the contents of self-configuration register 24 are transmitted to input register 212. Input register 212 retransmits those contents to multiplexer 214. Multiplexer 14 converts the parallel data received from input register 12 into serial data, converts it to an optical signal and transmits it over optical fiber 214.

Specifically multiplexer 214 first transmits one or more start bits. Preferably only one start bit is transmitted. After the start bit, a data identification bit is transmitted. This bit will have a preselected value indicative of the fact that the data packet contains configuration information rather than data to be transmitted to the communication port. For example, a value of 1 for the data identification bit may be preselected to indicate that the packet contains configuration information. The multiplexer then sequentially transmits the configuration bits. The data packet thus transmitted may be called a configuraton data packet.

If a valid configuration is determined to exist the transmitter shifts into normal transmit mode. Data from the communication port to which the transmitter is attached enters input register 212 through bus 216. This information is sent to multiplexer 214 which transmits a start bit followed by a data identification bit. The data identification bit will have the opposite value from the one sent as a part of the data packet containing configuration information. Thus if the configuration data packet used a data identification bit equal to 1, the data packets containing data to be transmitted to the communication port to which the receiver is attached will have a value of zero. The multiplexer then transmits the values of the bits received from input register 212. The data packet thus transmitted contains a message to be transmitted from one data port to another and so may be called a message data packet.

The value received by input register 212 is also transmitted to difference register 218 and stored therein. Input register 212 then continues to send its contents to difference register 218. Difference register 218 monitors the values it receives from input register 212 until it detects that a change has occurred. This may be done, for example, by performing an EXCLUSIVE-OR operation on each bit in difference register 218 and the corresponding bit of input register 12. When difference register 218 detects a change in the information stored in input register 212 it signals multiplexer 214 of that fact and multiplexer 214 transmits a data packet in the same manner as previously described. The data packet always contains a bit representative of the values of all of the lines of the communication port to which the transistor is connected that are active in the current configuration.

Figure 8:
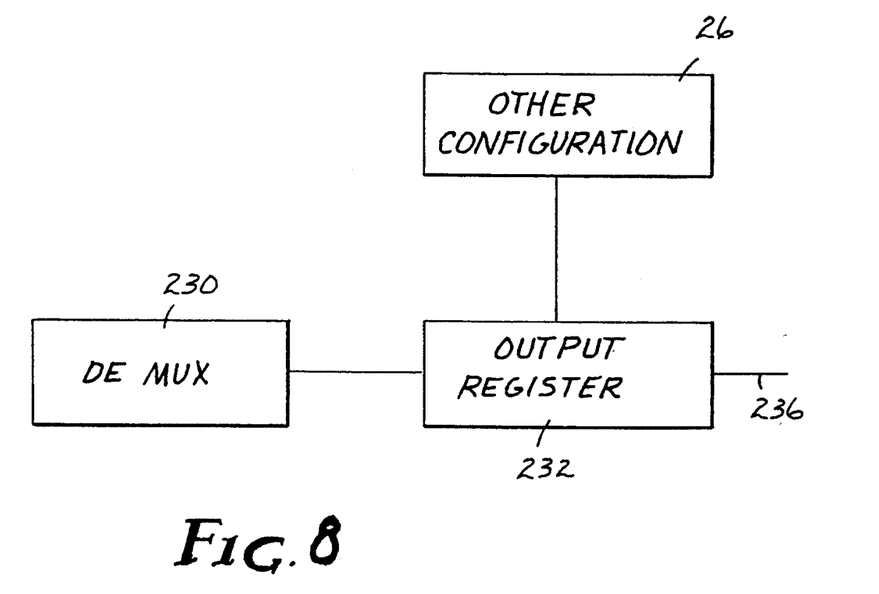
FIG. 8 is a block diagram of a receiver for use with the present invention.

FIG. 8 is a block diagram of receiver 12 of FIG. 1 according to the invention. In the receiver of FIG. 8, demultiplexer 230 receives the signal from a transmitter such as transmitter 10. Demultiplexer 230 then converts the optical signal to an electrical signal and rearranges the parallel data into serial data. Demultiplexer 230 then sends the parallel data to output register 232.

Output register 232 checks the data identification bit to determine whether the data packet is a configuration data packet or a message data packet. If the data identification bit indicates that the information is a configuration data packet it is stored in other configuration register 26. If it is a message data packet the data is transmitted to the communication port to which the receiver is connected over bus 236.

When the receiver has received configuration information and stored it in other configuration register 26, both self-configuration register 24 and other configuration register 28 transmit that information to system configuration register 28. System configuration register 28 determines whether a valid connection is possible between the two communication ports. If so, it stores a code associated with the configuration required to effect such communication. This code is transmitted to input/output controller 30, which uses that code to obtain information from a look up table allowing it to ensure that data to be transmitted by transmitter 10 is multiplexed with information from the various lines of the communication port in the proper order and information received by receiver 12 is demultiplexed properly with information being sent to the proper lines.

As noted above, the transmitter 10 only sends information to the receiver associated with the distant communication port when that information has changed. Those skilled in the art will realize that during normal communications over an RS232 data channel, the control signals rarely change. Furthermore it is quite common that several consecutive data bits will be equal to one another. It would seem that under those circumstances only the first data bit is transmitted. While it is true that no transmission is sent by the transmitter of FIG. 1 they are effectively transmitted. This is because the port to which the receiver is connected will have been set for a particular bit rate. For example, if the port is set to receive data at 9600 bits per second it will sample the logic level of the data line an integral multiple of 9600 times each second. The value that is there will be interpreted as the value of the current bit. For purposes of the circuitry of the communication port, it is not important whether any signal has actually been transmitted from the transmitter to the receiver. The advantage of only transmitting data from the transmitter to the receiver when the value of one of the bits changes is that it reduces the amount of power consumed by the transmitter. This is particularly important when the transmitter is part of a battery powered system.

A further improvement relates to the fact that some configurations may require fewer than the total possible number of data bits to be transmitted. For example, while the system may be capable of transmitting the values of 9 lines of an RS232 port, a particular configuration may require transmission of the values present on only 4 of those lines. Under these circumstances transmitter 14 may be configured to send the values present on only those 4 lines. Under those circumstances the receiver of FIG. 2 would be configured to expect to receive only the values on those 4 lines. This properly can be used to advantage to increase the data transmission rate. In the example given above the potential data transmission rate would be more than doubled.

It is important to note that while the number of data bits transmitted may run from 1 to the capacity of the system, in the Example 9, the number of bits in a data packet containing configuration information will be fixed. Thus if the configuration information is stored in a five bit format, all five bits must be sent in every data packet used to transmit configuration.

I claim:

1. Apparatus for determining the configuration of an electrical communication port, where said port comprises a plurality of data lines, each of said lines being capable of assuming either of two digital states, said apparatus comprising:
    difference register for storing information about said configuration;
    reset means for forcing said difference register into a first of said digital states;
    latching means for storing the digital state of one of said lines during a first time period; and
    comparison means for comparing said digital state stored in said latching means with the digital state of said line during a subsequent time period, said comparison means causing said difference register to change to a second digital state if said digital state stored by said latching means and said digital state of said line during a subsequent time are different, said second digital state differing from said first digital state.

2. The apparatus of claim 1 wherein said latching means comprises a D-type flip flop.

3. The apparatus of claim 1 wherein said difference register comprises a D-type flip flop.

4. The apparatus of claim 2 wherein said comparison means comprises a Schmitt trigger.

5. Apparatus for determining the configuration of an electrical communication port, where said port comprises a plurality of data lines, each of said lines being capable of assuming either of two digital states, said apparatus comprising:
    difference register for storing information about said configuration;
    reset means for forcing said difference register into a first of said digital states;
    driver means for attempting to force a preselected one of said lines to one of said digital states;

comparison means for comparing the digital state of said preselected line with said one of said digital states, said comparison means causing said difference register to change to a second digital state if said digital state of said preselected line and said one of said digital states are different.

6. The apparatus of claim 5 wherein said driver means force said preselected line alternately into said first and second digital states.

7. The apparatus of claim 6 wherein said comparison means comprises first and second voltage comparators.

* * * * *